US010230539B2

(12) United States Patent
 Cho

(10) Patent No.: US 10,230,539 B2
(45) Date of Patent: Mar. 12, 2019

(54) COMMUNICATIONS DEVICE HAVING RELAY

(71) Applicant: LSIS CO., LTD., Gyeonggi-do (KR)

(72) Inventor: Choong-Kun Cho, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/353,915

(22) Filed: Nov. 17, 2016

(65) Prior Publication Data

US 2017/0264459 A1   Sep. 14, 2017

(30) Foreign Application Priority Data

Mar. 8, 2016  (KR) .................. 10-2016-0027482

(51) Int. Cl.
 *H04L 12/40* (2006.01)
 *H04L 12/24* (2006.01)
 *H04L 12/12* (2006.01)

(52) U.S. Cl.
 CPC ........ *H04L 12/40176* (2013.01); *H04L 12/12* (2013.01); *H04L 12/40169* (2013.01); *H04L 41/0668* (2013.01)

(58) Field of Classification Search
 CPC .................. H04L 12/40169; H04L 12/12; H04L 41/0668
 See application file for complete search history.

(56) References Cited

U.S. PATENT DOCUMENTS

| 7,061,926 B2 | 6/2006 | Breinlinger |
| 2007/0025240 A1 | 2/2007 | Snide |
| 2017/0034958 A1* | 2/2017 | Takahashi ............ H05K 7/2059 |

FOREIGN PATENT DOCUMENTS

| EP | 0044685 A1 | 1/1982 |
| JP | H02241154 A | 9/1990 |
| JP | 2000196627 A | 7/2000 |
| JP | 3719196 B2 | 11/2005 |
| JP | 2008187243 A | 8/2008 |
| JP | 2009218732 A | 9/2009 |
| JP | 2010-195133 A | 9/2010 |
| JP | 2011-114625 A | 6/2011 |
| JP | 2011-154425 A | 8/2011 |
| JP | 2014-212435 A | 11/2014 |
| JP | 2015130613 A | 7/2015 |
| KR | 10-2012-0084516 A | 7/2012 |
| KR | 10-2015-0130016 A | 11/2015 |
| KR | 20160027753 A | 3/2016 |

OTHER PUBLICATIONS

Japanese Office Action for related Japanese Application No. 2016-222649; action dated Oct. 31, 2017 (3 pages).

(Continued)

*Primary Examiner* — Gbemileke J Onamuti
(74) *Attorney, Agent, or Firm* — K&L Gates LLP

(57) ABSTRACT

A communications device includes a master unit and a block of slave units including a plurality of slave units control by the master unit. Each of the slave units include first and second ports to which different communications lines are connected, respectively, and a relay disposed between the first port and the second port and open/closed depending on whether power is supplied.

7 Claims, 6 Drawing Sheets

(56) References Cited

OTHER PUBLICATIONS

Korean Office Action dated Feb. 13, 2017 in corresponding the counterpart Korean Patent Application No. 9-5-2017-010737035.
European Search Report dated Jan. 23, 2017 in corresponding the Counterpart European Patent Application No. 16195453.2.
Japanese Office Action for related Japanese Application No. 2016-222649; action dated May 29, 2018; (2 pages).

* cited by examiner

PRIOR ART

PRIOR ART

100

COMMUNICATIONS DEVICE HAVING RELAY

CROSS REFERENCE TO RELATED APPLICATION

This application claims the benefit of Korean Patent Application No. 10-2016-0027482, filed on Mar. 8, 2016, entitled "COMMUNICATION DEVICE HAVING RELAY", which is hereby incorporated by reference in its entirety into this application.

BACKGROUND

1. Technical Field

The present disclosure relates to a communications device having relays and more specifically, to a communications device having relays that allow the communications device to conduct communications via the relays even if a power failure occurs.

2. Description of the Related Art

As industrial Ethernet technology is less costly, has high efficiency and is convenient to maintain, more and more applications can be found in the industrial fields in place of field buses. Such Ethernet may be connected in a ring, a line, etc. The ring connection is advantageous in that it has simple connection and saves cost, and thus is frequently used.

FIG. 1 is a block diagram of an existing daisy chain communications device.

As shown in FIG. 1, the communications device includes a master unit 10, first to fourth slave units 20, 30, 40 and 50. The slave units are connected to one another so that they can communicate via first and second ports P1 and P2 of each of the slave units. In addition, the slave units include communications processors 22, 32, 42 and 52, respectively, to process commands or data received from the master unit 10. With this configuration, the first to fourth slave units 20, 30, 40 and 50 may be controlled by the single master unit 10 by using minimal lines to communicate with one another. Each of the slave units may include a power module therein to receive power. For example, an inverter may be included.

If power failure occurs in one of the slave units, e.g., the second slave unit as shown in FIG. 2, the slave unit and the subsequent slave units cannot conduct communications any more.

For example, power supplied to the second slave unit 30 is interrupted, the second slave unit 30 cannot conduct communications. Additionally, in the communications device with the configuration shown in FIG. 2, the third slave unit 40 and the fourth slave unit 50 cannot communicate with others, either after the failure has occurred in the second slave unit 30.

To solve such problem, it may be contemplated to connect a cable that supplies power directly to a slave unit, i.e., duplex power to the communications device. This approach, however, may increase installation cost and time, and unexpected difficulty may take place due to many power cables. In addition, a lot of effort may be required for maintenance.

SUMMARY

It is an aspect of the present disclosure to provide a communications device in which relays are selectively connected to conduct communications for emergency when power failure occurs in the communications device.

It is another aspect of the present disclosure to provide a communications device having relays that allow other slave units to conduct communications even when power failure occurs in one of the slave units.

It is another aspect of the present disclosure to provide a communications device having relays that allow a slave unit with a power failure to perform self bypass function without any additional controller or control signal.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, a communications device includes a master unit and a block of slave units including a plurality of slave units control by the master unit. Each of the slave units include first and second ports to which different communications lines are connected, respectively, and a relay disposed between the first port and the second port and open/closed depending on whether power is supplied.

The relay may be open to make an open circuit between the first port and the second port when the power is supplied.

The relay may be closed to make a closed circuit between the first port and the second port when the power is not supplied.

When the power is not supplied, a communications path can be formed that passes the first port and the second port via the relay.

The slave units may be connected to one another so that they can communicate with one another via the first port and the second port, and if one of the slave units is not powered, the slave unit is able to transfer a command and data to a next slave unit via the relay.

According to an exemplary embodiment of the present disclosure, relays can be selectively connected to conduct communications for emergency when power failure occurs in the communications device.

According to another exemplary embodiment of the present disclosure, other slave units can conduct communications even when power failure occurs in one of the slave units.

According to another exemplary embodiment of the present disclosure, a slave unit with a power failure can perform self bypass function without any additional controller or control signal.

DETAILED DESCRIPTION

Figure 1:
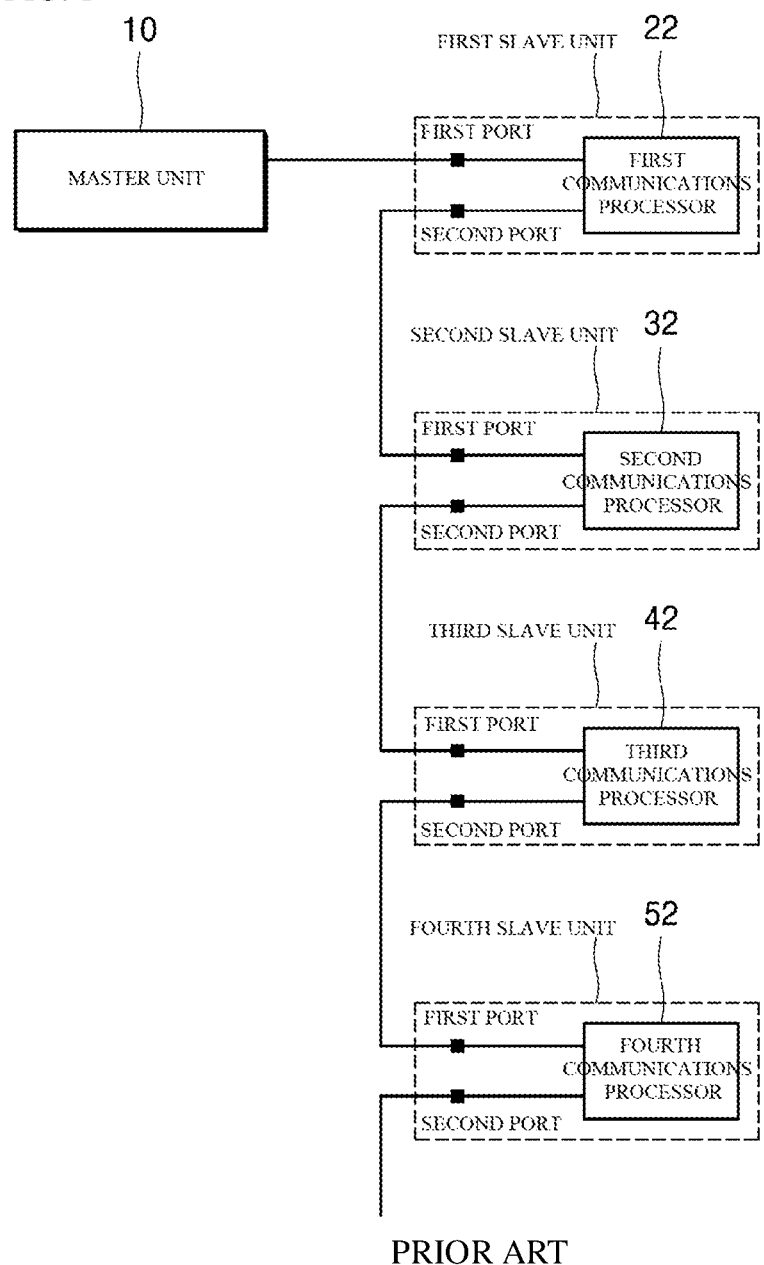
FIG. 1 is a block diagram of an existing daisy chain communications device.
Figure 2:
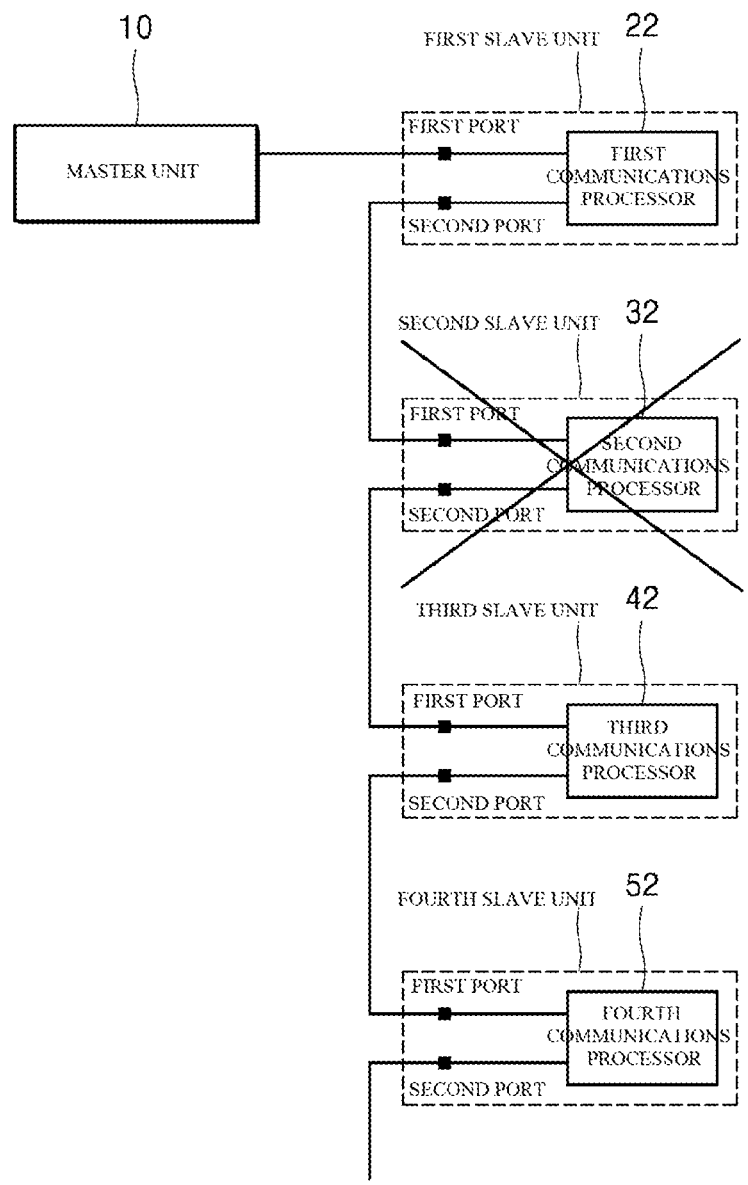
FIG. 2 is a block diagram of the existing communications device when failure occurred.

The above objects, features and advantages will become apparent from the detailed description with reference to the accompanying drawings. Embodiments are described in sufficient detail to enable those skilled in the art in the art to easily practice the technical idea of the present disclosure. Detailed disclosures of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 3:
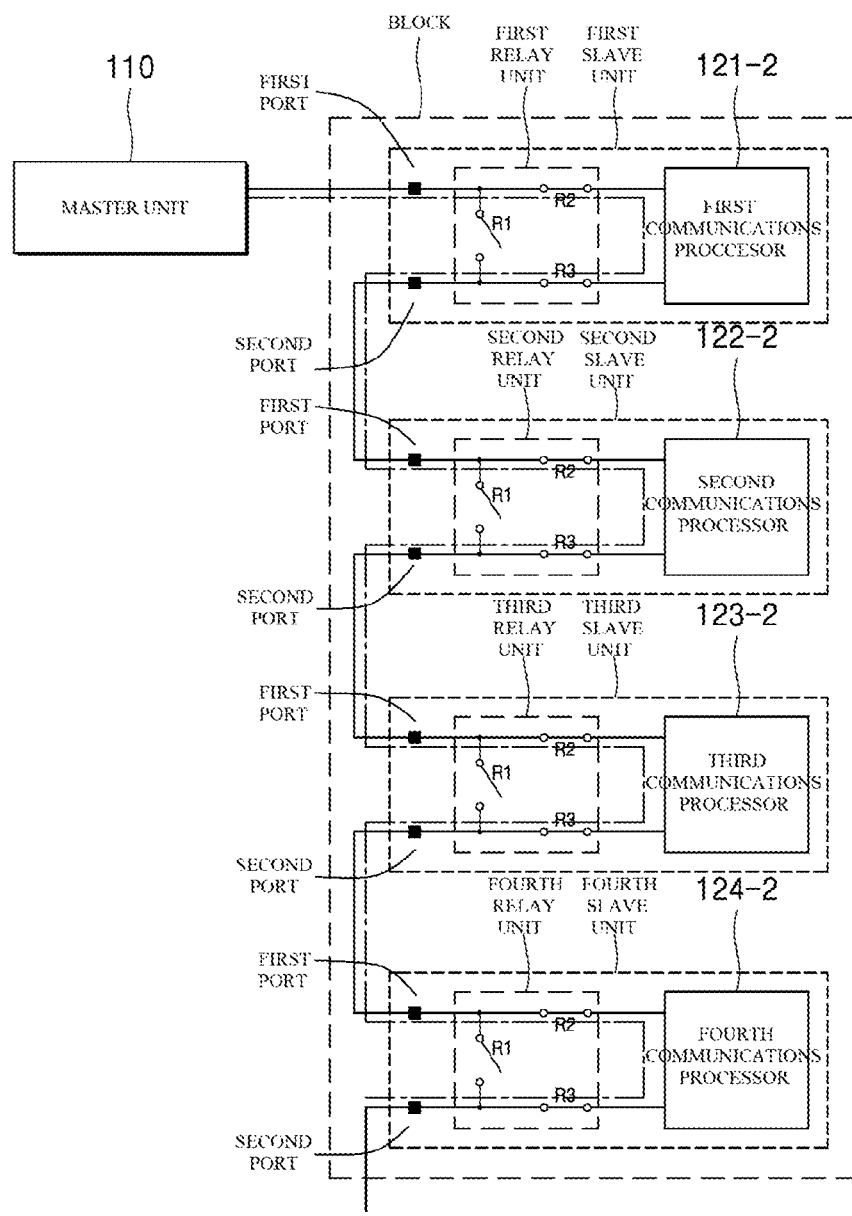
FIG. 3 is a block diagram of a communications device including relays according to an exemplary embodiment of the present disclosure.

FIG. 3 is a block diagram of a communications device including relays according to an exemplary embodiment of the present disclosure.

Referring to FIG. 3, the communications device 100 according to an exemplary embodiment of the present disclosure includes a master unit 110 and a block 120 of slave units controlled by the master unit 110. The block 120 of the slave units includes first to fourth slave units 121, 122, 123 and 124. Although four (4) slave units are illustrated in this exemplary embodiment, the number of the slave units is not limited to four.

The master unit 110 is connected to the first slave unit 121 so that it can control the slave units 121, 122, 123 and 124 individually. In addition, the master unit 110 may provide commands and data designated to each of the slave units via the first slave unit 121. Specifically, the master unit 110 may provide the commands and data designated to each of the slave units in the form of packets. The first to fourth slave units 121 to 124 connected in a daisy chain may receive and process commands and data designated thereto.

Specifically, in the block 120 of the slave units, the first slave unit 121 includes two communications ports, i.e., first and second ports P1 and P2, a first relay unit 121-1 and a first communications processor 121-2. Although not shown in the drawings, each of the slave units may include a power module therein to receive power. For example, an inverter may be included.

The first slave unit 121 is connected to the master unit 110 via the first port P1 and is connected to the second slave unit 122 via the second port P2.

The first relay unit 121-1 is controlled so that it can conduct communications with the first communications processor 121-2 when power is supplied. In addition, the first relay unit 121-1 is controlled so that it interrupts communications with the first communications processor 121-2 and can conduct communications with the next slave unit, e.g., the second slave unit 122 when power is not supplied. The first relay unit 121-1 will be described in more detail below with reference to FIGS. 4 and 5.

The first communications processor 121-2 may process commands or data received from the master unit 110.

The second slave unit 122 has a similar configuration with that of the first slave unit 121. The second slave unit 122 includes two communications ports, i.e., first and second ports P1 and P2, a second relay unit 122-1 and a second communications processor 122-2.

The second slave unit 122 is connected to the first slave unit 121 via the first port P1 and is connected to the third slave unit 123 via the second port P2. The functionality and operation of the second relay unit 122-1 and the second communications processor 122-2 included in the second slave unit 122 are identical to those of the first slave unit 121 described above.

That is, in the normal operation, the second relay unit 122-1 is controlled so that it can conduct communications with the second communications processor 122-2. The second communications processor 122-2 may process commands or data received from the master unit 110 when the second relay unit 122-1 can conduct communications with it.

If a power failure occurs, however, the second relay unit 122-1 is controlled so that it interrupts communications with the second communications processor 122-2 and can conduct communications with the next, third slave unit 123.

The configuration and operation of the third and fourth slave units 123 and 124 are identical to those of the first and second slave units 121 and 122; and, therefore, redundant description will be omitted.

It is to be noted that when one of the slave units can conduct communications, its communications processor 121-2, 122-3, 123-2 or 124-2 can receive and process commands or data sent from the master unit 110.

Although the first and second ports P1 and P2 included in each of the slave units 121, 122, 123 and 124 are indicated by the same reference numerals for convenience of illustration, it is to be noted that they are difference ports at different physical locations. The first and second ports P1 and P2 may be RJ45 ports. Although each of the ports shown in FIG. 3 has a single line, each of the ports may include a plurality of lines, e.g., eight lines. However, the number of the lines is not limited herein. In other words, the configuration of the ports and the connection of the lines are not particularly limited herein.

That is, the configuration of the ports and the connection of the lines are not particularly limited herein as long as they can maintain communications via one of the relay units 121-1, 122-1, 123-1 and 124-1 even when one of the slave units is not powered.

The first relay unit 121-1 will be described in detail with reference to FIGS. 4 and 5. The configuration of the relay units 122-1, 123-1 and 124-1 in the slave units 122-1, 123-1 and 124-1, respectively, is similar to that of the first relay 121-1, and thus the rest of the relay units 122-1, 123-1 and 124-1 will not be described to avoid redundancy.

Figure 4:
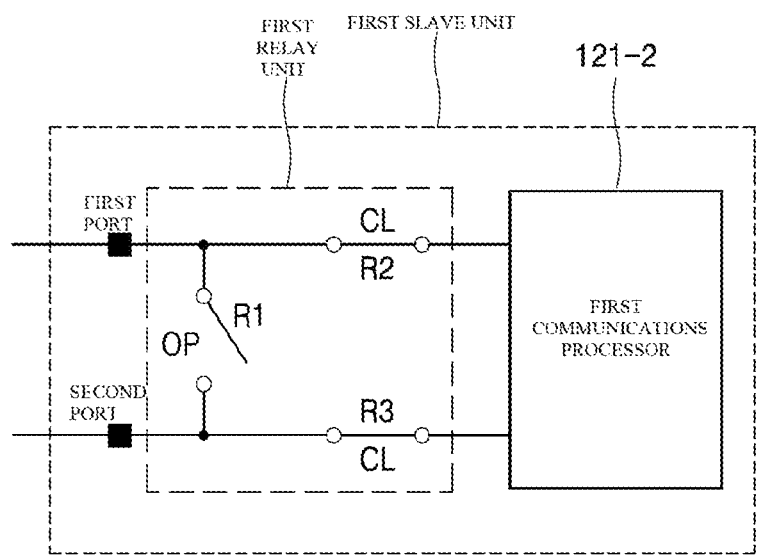
FIGS. 4 and 5 are block diagrams of the first slave unit shown in FIG. 3.

FIG. 4 shows connection of the first relay 121-1 of the first slave unit 121 in the normal operation.

The first relay unit 121-1 includes a first relay R1, a second relay R2 and a third relay R3.

The first relay R1 is disposed between first and second ports P1 and P2. The first relay R1 may be implemented as an a-contact (arbeit contact) relay. Specifically, the a-contact relay is normally opened (OP) and is closed (CL) by magnetic force in the case of abnormality.

Accordingly, when the first relay R1 is powered, the contacts remain opened to make an open circuit between the first port P1 and the second port P2.

When the first relay R1 is not powered, i.e., in the case of abnormality, the contacts are closed to make a closed circuit between the first port P1 and the second port P2.

The second relay R2 is disposed between the first port P1 and the first communications processor 121-2. The second relay R2 may be implemented as a b-contact (break contact) relay. Contrary to the a-contact relay, the b-contact relay is normally closed (CL) and is opened (OP) by magnetic force in the case of abnormality.

Accordingly, when the second relay R2 is powered, the contacts remain closed. As a result, the information received via the first port P1 can be processed by the first communications processor 121-2.

The third relay R3 is disposed between the second port P2 and the first communications processor 121-2. The third relay R3 may be implemented as a b-contact (break contact) relay. Specifically, the b-contact relay is normally closed (CL) and is opened (OP) by magnetic force in the case of abnormality.

Accordingly, when the third relay R3 is powered, the contacts remain closed. As a result, in the normal operation, the communications with the second slave unit 122 (see FIG. 3) can be made via the third relay R3 and the second port P2.

Figure 5:
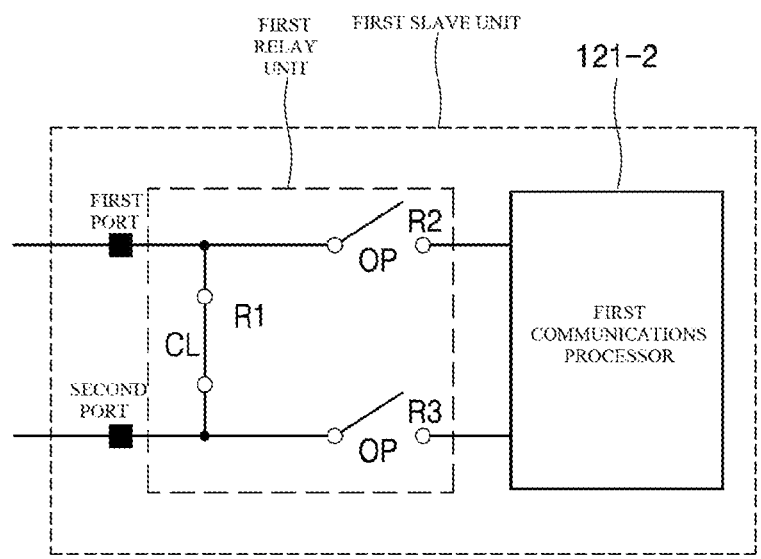

FIG. 5 shows connection of the first relay unit 121-1 of the first slave unit 121 in the abnormal operation, i.e., when a power failure has occurred.

When the first relay R1 is not powered, the first relay R1 is closed (CL) and the second and third relays R2 and R3 are opened (OP).

Accordingly, if a power failure occurs, the first relay R1 is connected such that a direct communications path from the first port P1 to the second port P2 can be created. By doing so, the communications path is still provided even after the power failure has occurred in the slave unit, and thus commands and data from the master unit 110 (see FIG. 3) can be transferred.

At this time, the second and third relays R2 and R3 are opened (OP), such that the first communications processor 121-2 is bypassed.

As described above, the a-contact relay composed of a circuit including an electromagnet and is normally opened (OP), and the contacts are closed by magnetic force in the case of abnormality. The b-contact relay also composed of a circuit including an electromagnet. However, unlike the a-contact relay, it is normally closed (CL) and is opened (OP) by magnetic force in the case of abnormality, in this exemplary embodiment, when no power is supplied.

Accordingly, when no power is supplied to the slave unit, i.e., when the communications processor in the slave unit cannot operate, the second and third relays R2 and R3 are opened. As a result, the communications path can be blocked reliably.

In this manner, according to the exemplary embodiment of the present disclosure, the communications device employs the a-contact relays and the b-contact relays and control so that communications among other slave units are not affected by a slave unit in which a failure has occurred.

Although the first relay unit 121-1 is disposed outside the first communications processor 121-2 in this exemplary embodiment, this is merely illustrative. The first relay unit 121-1 may be incorporated in an application specific integrated circuit (ASIC) chip inside the first communications processor 121-2 depending on design choice.

Figure 6:
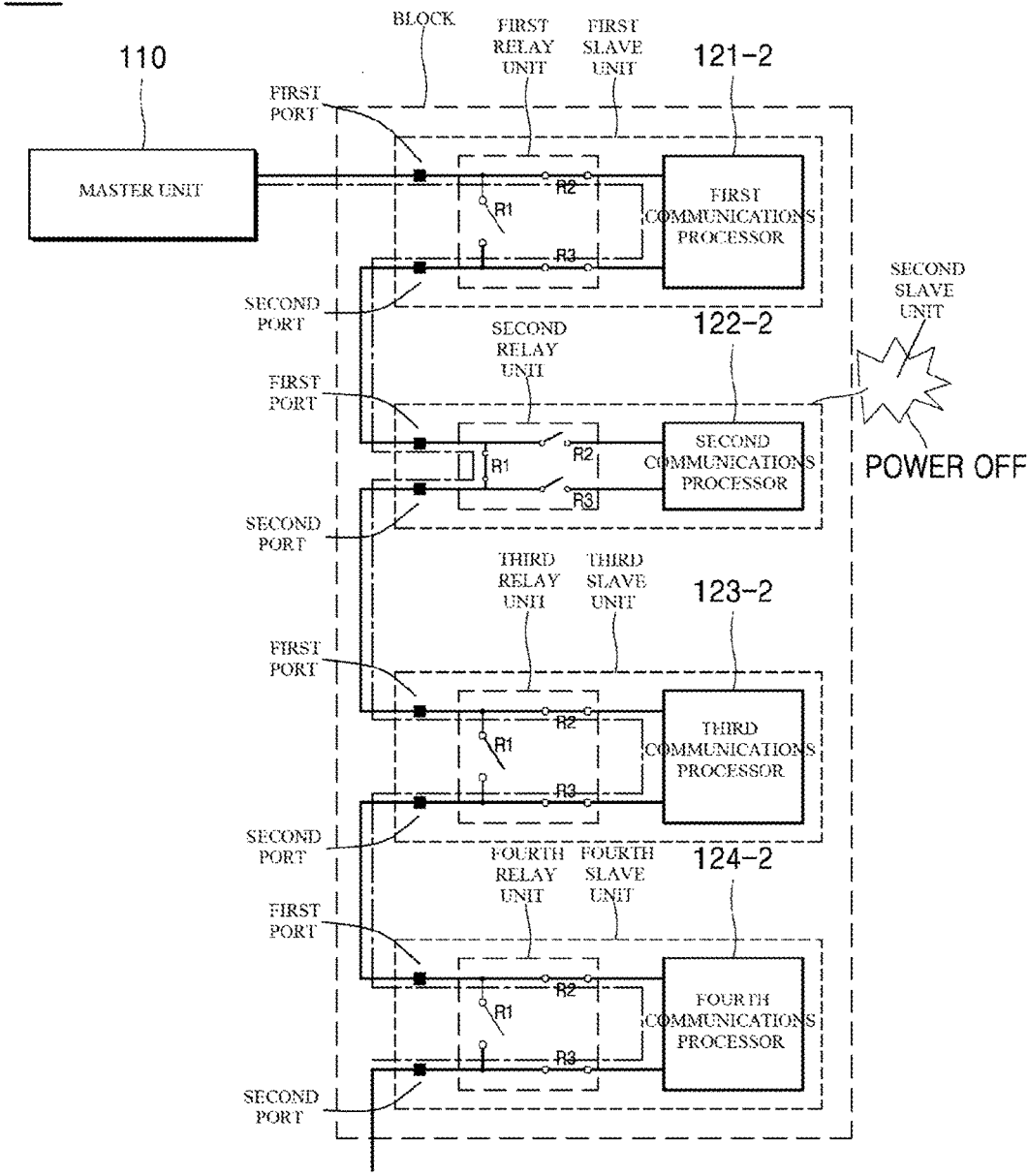
FIG. 6 is a block diagram of the communications device of FIG. 3 when failure has occurred.

FIG. 6 shows the communications device of FIG. 3 when a failure has occurred.

Referring to FIG. 6, power is not supplied to the second slave unit 122.

Communications are conducted between the master unit 110 and the first slave unit 121.

Since power is supplied to the first slave unit 121, the first relay unit 121-1 provides a path to allow the first communications processor 121-2 to operate. In addition, a communications path for the second slave unit 122 to receive commands and data from the master unit 110 is provided. The connection of the first relay unit 121-1 in the normal operation may be the same as shown in FIG. 4.

However, when power is not supplied to the second slave unit 122 due to power failure (POWER OFF), the first relay R1 of the second relay unit 122-1 in the second slave unit 122 is closed (CL) while the second and third relays R2 and R3 thereof are opened (OP). As a result, the second communications processor 122-2 in the second slave unit 122 is bypassed, and a communications path can be created in the second slave unit 122 via the first relay R1. Accordingly, even if the second slave unit 122 is not operated due to the power failure, the communications path to the third slave unit 123 can be provided via the first relay R1.

Subsequently, the third slave unit 123 and the fourth slave unit 124 are powered and operated normally. The connection of each of the third and fourth relay units 123-1 and 124-1 may be the same as that shown in FIG. 4.

If the failure is addressed, i.e., the second slave unit 122 is normally powered, the first relay R1 is opened (OP) while the second and third relays R2 and R3 are closed (CL) automatically.

In addition, although not shown in the drawings, if the second and third relay units 122 and 123 are not powered due to a power failure, the first relay of each of the second relay unit 122-1 and the third relay unit 123-1 is closed. In addition, the second and third relays of each of the second relay unit 122-1 and the third relay unit 123-1 are opened. Accordingly, the second and third communications processors 122-2 and 123-2 are bypassed, and a communications path can be created via the first relay R1 in each of the second and third slave units 122 and 123. Accordingly, even if the second and third slave units 122 123 are not operated due to the power failure, the communications path to the fourth slave unit 124 can be provided via the first relays.

As such, according to an exemplary embodiment of the present disclosure, by employing relays that are selectively opened and closed depending on whether power is supplied when a power failure occurs in the communications device, there is no need for an additional power line.

Further, according to an exemplary embodiment of the present disclosure, other slave units can conduct communications even when a power failure occurs in one of the slave units.

The slave unit in which the power failure has occurred can be bypassed without an additional controller or a control signal for controlling such operation.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings

What is claimed is:

1. A communications device comprising:
a master unit; and
a plurality of slave units controlled by the master unit and connected to the master unit in a daisy chain,
wherein each of the slave units comprises:
a first port and a second port, each of which is connected to any one of the master unit and the other slave units;
a communications processor configured to process a command or data received from the master unit;
a first relay disposed between the first port and the second port, wherein the first relay is configured to open and close depending on whether power is supplied to a corresponding slave unit;
a second relay disposed between the first port and the communications processor; and
a third relay disposed between the second port and the communications processor,
wherein the first relay is closed to make a closed circuit between the first port and the second port when the power is not supplied to the corresponding slave unit,
wherein the second relay and the third relay are opened to bypass the communications processor when the power is not supplied to the corresponding slave unit, and
wherein a communications path is formed between the first port and the second port while the communications processor is bypassed when the first relay is closed.

2. The communications device of claim 1, wherein the first relay is open to make an open circuit between the first port and the second port when the power is supplied to the corresponding slave unit.

3. The communications device of claim 1, wherein the slave units are connected to one another so that the slave units can communicate with one another via the first port and the second port, and if one of the slave units is not powered, the one of the slave units is able to transfer the command or the data to a next slave unit via the first relay.

4. The communications device of claim 1, wherein the first relay is an a-contact relay.

5. The communications device of claim 1, wherein the first relay is normally opened and is closed when the power is not supplied to the corresponding slave unit.

6. The communications device of claim 1, wherein at least one of the second and third relays is a b-contact relay.

7. The communications device of claim 1, wherein at least one of the second and third relays is normally closed and is opened when the power is not supplied to the corresponding slave unit.

\* \* \* \* \*